(12) United States Patent
Min et al.

(10) Patent No.: US 11,087,184 B2
(45) Date of Patent: Aug. 10, 2021

(54) NETWORK REPARAMETERIZATION FOR NEW CLASS CATEGORIZATION

(71) Applicant: NEC Laboratories America, Inc., Princeton, NJ (US)

(72) Inventors: Renqiang Min, Princeton, NJ (US); Kai Li, Somerville, MA (US); Bing Bai, Princeton Junction, NJ (US); Hans Peter Graf, South Amboy, NJ (US)

(73) Assignee: NEC Corporation

( * ) Notice: Subject to any disclaimer, the term of this patent is extended or adjusted under 35 U.S.C. 154(b) by 134 days.

(21) Appl. No.: 16/580,199

(22) Filed: Sep. 24, 2019

(65) Prior Publication Data

US 2020/0097757 A1 Mar. 26, 2020

Related U.S. Application Data

(60) Provisional application No. 62/799,356, filed on Jan. 31, 2019, provisional application No. 62/767,158, filed on Nov. 14, 2018, provisional application No. 62/736,004, filed on Sep. 25, 2018.

(51) Int. Cl.
*G06K 9/62* (2006.01)
*G06N 3/08* (2006.01)
*G06K 9/46* (2006.01)

(52) U.S. Cl.
CPC ............... *G06K 9/628* (2013.01); *G06K 9/46* (2013.01); *G06K 9/6257* (2013.01); *G06K 9/6262* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 8,341,095 B2 * | 12/2012 | Bai | G06F 16/313 706/12 |
| 2019/0087728 A1 * | 3/2019 | Agarwal | G06F 16/2455 |
| 2019/0385106 A1 * | 12/2019 | Iventosch | G06K 9/628 |

OTHER PUBLICATIONS

A Simple yet Effective Model for Zero-Shot Learning, by Cao et al, 2018 IEEE winter conference on application of computer vision, Mar. 2018 (Year: 2018).*

Snell et al., "Prototypical Networks for Few-shot Learning", 31st Conference on Neural Information Processing Systems (NIPS 2017), Dec. 2017, pp. 1-11.

(Continued)

*Primary Examiner* — Vikkram Bali
(74) *Attorney, Agent, or Firm* — Joseph Kolodka

(57) ABSTRACT

A computer-implemented method and system are provided for training a model for New Class Categorization (NCC) of a test image. The method includes decoupling, by a hardware processor, a feature extraction part from a classifier part of a deep classification model by reparametrizing learnable weight variables of the classifier part as a combination of learnable variables of the feature extraction part and of a classification weight generator of the classifier part. The method further includes training, by the hardware processor, the deep classification model to obtain a trained deep classification model by (i) learning the feature extraction part as a multiclass classification task, and (ii) episodically training the classifier part by learning a classification weight generator which outputs classification weights given a training image.

20 Claims, 4 Drawing Sheets

(56) References Cited

OTHER PUBLICATIONS

Sung et al., "Learning to Compare: Relation Network for Few-Shot Learning", arXiv:1711.06025v2 [cs.CV] Mar. 27, 2018, pp. 1-10.
Vasawani et al., "Attention Is All You Need", arXiv:1706.03762v5 [cs.CL] Dec. 6, 2017, pp. 1-11 pages.
Zhang et al., "Learning a Deep Embedding Model for Zero-Shot Learning", 2017 IEEE Conference on Computer Vision and Pattern Recognition (CVPR), Jul. 2017, pp. 2021-2030.

\* cited by examiner

NETWORK REPARAMETERIZATION FOR NEW CLASS CATEGORIZATION

RELATED APPLICATION INFORMATION

This application claims priority to provisional application Ser. No. 62/736,004 filed on Sep. 25, 2018, provisional application No. 62/767,158 filed on Oct. 14, 2018 and provisional application No. 62/799,356 filed on Jan. 31, 2019 and are incorporated herein by reference.

BACKGROUND

Technical Field

The present invention relates to artificial neural networks, and more particularly to neural network weight reparameterization for new class categorization.

Description of the Related Art

Rich and accessible labeled data fuels the success of the deep learning in various tasks, e.g., visual recognition, object detection, machine translation, and so forth. However, the demand of such annotated data severely limits deep learning algorithms' scalability to new classes for which only a limited amount of information can be accessed. Hence, there is a need for an improved approach for New Class Categorization (NCC).

SUMMARY

According to an aspect of the present invention, a computer-implemented method is provided for training a model for New Class Categorization (NCC) of a test image. The method includes decoupling, by a hardware processor, a feature extraction part from a classifier part of a deep classification model by reparametrizing learnable weight variables of the classifier part as a combination of learnable variables of the feature extraction part and of a classification weight generator of the classifier part. The method further includes training, by the hardware processor, the deep classification model to obtain a trained deep classification model by (i) learning the feature extraction part as a multiclass classification task, and (ii) episodically training the classifier part by learning a classification weight generator which outputs classification weights given a training image.

According to another aspect of the present invention, a computer program product is provided for training a model for New Class Categorization (NCC) of a test image. The computer program product includes a non-transitory computer readable storage medium having program instructions embodied therewith. The program instructions are executable by a computer to cause the computer to perform a method. The method includes decoupling, by a hardware processor of the computer, a feature extraction part from a classifier part of a deep classification model by reparametrizing learnable variables of the classifier part as a combination of learnable variables of the feature extraction part and of a classification weight generator of the classifier part. The method further includes training, by the hardware processor, the deep classification model to obtain a trained deep classification model by (i) learning the feature extraction part as a multiclass classification task, and (ii) episodically training the classifier part by learning a classification weight generator which outputs classification weights given a training image and the limited exemplar class information below the threshold amount corresponding to the training image.

According to yet another aspect of the present invention, a computer processing system is provided for training a model for New Class Categorization (NCC) of a test image. The computer processing system includes a memory device including program code stored thereon. The computer processor system further includes a hardware processor, operatively coupled to the memory device, and configured to run the program code stored on the memory device to decouple a feature extraction part from a classifier part of a deep classification model by reparametrizing learnable variables of the classifier part as a combination of learnable variables of the feature extraction part and of a classification weight generator of the classifier part. The hardware processor is further configured to run the program code to train the deep classification model to obtain a trained deep classification model by (i) learning the feature extraction part as a multiclass classification task, and (ii) episodically training the classifier part by learning a classification weight generator which outputs classification weights given a training image.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to network reparameterization for new class categorization. As used herein, the term "reparameterization" refers to reparametrizing the learnable weights of a neural network as a function of other variables".

By using the aforementioned reparameterization, classification of images corresponding to new classes can be achieved when faced with limited exemplary class information such as a number of semantic attributes and/or a small number of labeled examples with the total number below a threshold amount. The threshold amount can be set by a user depending upon the application and/or the amount of available labeled examples. These and other features of the present invention are readily determined by one of ordinary skill in the art given the teachings of the present invention provided herein.

Figure 1:
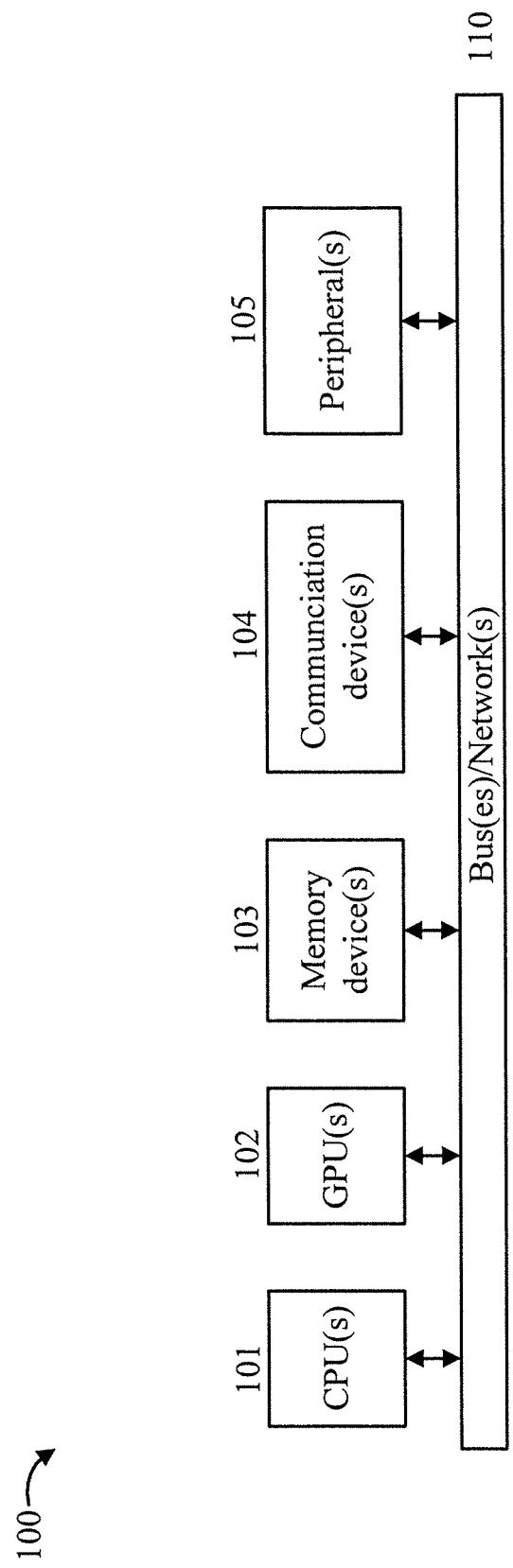
FIG. 1 is a block diagram illustrating an exemplary processing system to which the present principles may be applied, according to an embodiment of the present principles.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, and so forth) can be used to implement various aspects of the present invention. In an embodiment, one or more elements from FIG. 2 can be implemented as a module stored in memory devices 103.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As used herein, the term "hardware processor subsystem" or "hardware processor" in short refers to a processor, memory, and software combination that cooperate to perform one or more specific tasks. In an embodiment, the hardware processor subsystem can include one or more data processing elements (e.g., logic circuits, etc.). In an embodiment, the one or more data processing elements can be included in a central processing unit, a graphics processing unit, and/or a separate processor or computing element-based (e.g., logic gates, etc.) controller. In an embodiment, the hardware processor subsystem can include one or more on-board memories (e.g., caches). In an embodiment, the hardware processor subsystem can include one or more other memories (e.g., ROM, RAM, BIOS). In an embodiment, the hardware processor subsystem can include and execute one or more software applications. In an embodiment, the one or more software applications can include the operating system and/or one or more other applications and/or specific code to achieve a specified result. These and other variations of a hardware processor subsystem are readily determined given the teachings of the present invention provided herein.

In accordance with various embodiments of the present invention, two factors are provided to enable New Class Categorization (NCC). The first factor is a powerful feature extractor that outputs discriminative feature representations for any given image. The second factor is a flexible classifier model that can be easily adapted to new classes with scarce information provided.

By training a deep model in an episode-based way, occasionally with some well-designed deep neural network updating rules, the present invention can provide a deep model that is adaptive to new classes. In each episode, some randomly sampled classes are selected and serve as a NCC task for the model. The model learns how to be adaptive to new tasks after many training episodes. Then, during the testing stage, as a new NCC task is presented, the model can handle it well using the knowledge the model has learned during the training. However, we found that this episode-based training strategy limits the discriminative capability of the feature extraction model because it does not fully exploit the diversity and variance of all classes within the training dataset. The model treats the classes in each episode as new classes and attempts to separate them so that it does not have memory of the competing information of these classes with the other ones within the dataset but beyond the current episode. Due to the neglect of this global information, the capability of the feature extraction model is suppressed, thus limiting the NCC performance.

With regard to the form of the exemplar information provided about new classes, categorization can be classified as zero-shot learning (ZSL) and few-shot learning (FSL).

ZSL emerges in situations where we have never seen a class before but get some semantic descriptions of the class. We need to recognize the class based on the semantic descriptions. In practice, ZSL is performed by first learning an embedding space where semantic vectors and the visual feature are interacted and second finding the best among semantic vectors of new classes that matches the visual feature of any given image of the new classes within the learned embedding space. Since the embedding space is often of high dimension, finding the best match of a given vector among many candidates shall inevitably encounter the hubness problem, i.e., some candidates will be biased to be the best matches for many of the queries. Depending on the chosen embedding space, the severity of this problem varies.

In accordance with one or more embodiments of the present invention directed to ZSL, we formulate bridging the semantic space and the visual space as a visual feature classification problem conditioned on the semantic features. A model is learned that generates classification weights of the visual feature when fed with semantic features. Due to the nature of the classification problem, both intra-class compactness (visual features of the same classes are assigned with the same label) and inter-class separability (visual features of different classes are assigned with different labels) are exploited, thus resulting in a better mapping.

Regarding FSL, the same aims to recognize new classes when provided with one/a few labeled samples of these classes. Further regarding FSL, one or more embodiments of the present invention use a standard deep CNN model to get the feature extraction model.

It is proposed herein to secure both of the above two factors through network reparameterization, i.e., reparametrizing the learnable weights of a network as a function of other variables. It is proposed to decouple the feature extractor and classifier of a deep classification model and learn the feature extractor as a standard multi-class classification task to ensure a discriminative feature extractor. As used herein, the term "deep classification model" refers to a deep neural network trained for multi-class classification that can have a flexible architecture suitable for the input data under consideration. For the classifier, a generic classification weight generator is learned which outputs classification weights given limited exemplar information about the classes. The classification weight generator is trained by following the episode-based training scheme to secure the flexibility and adaptability. Embodiments of the present invention can be flexibly applied to both ZSL and FSL, where the exemplar information about unseen are provided in the form of the semantic attributes or one/a few labeled samples, respectively.

One of the most distinct aspects of one or more embodiments of the present invention from existing approaches is that we decouple the feature extractor part and the classifier part of the deep classification model, and obtain each part in the most beneficial tasks. The feature extractor is trained as a standard multi-class classification task. This is motivated by the observation that a simple linear classifier (e.g., nearest neighbor), when taking as input features obtained by a powerful extractor, can outperform some sophisticated FSL models that use weaker feature extraction models.

Embodiments of the present invention are directed to novel categorization, which is to recognize objects of new classes given only minimal information (a few labeled samples or the attributes) of the classes. Formally, consider that there are three datasets $D=\{D_t, D_s, D_u\}$, where $D_t=\{X_t, Y_t\}$ is the training set and $D_u=\{X_u, Y_u\}$ is the test set, with $X_t$ and $X_u$ being the images, and $Y_t$ and $Y_u$ being the corresponding labels. There is no overlap between training classes and testing classes, i.e., $Y_t \cap Y_u = \emptyset$. The goal of novel categorization is to learn from $D_t$ generic information that can be applied to classify new classes from $D_u$, with the help of supporting information from Ds. For ZSL, $D_s = A_t \cup A_u$ is the union of the semantic attribute vectors $A_t$ for seen classes $Y_t$ and $A_u$ for new classes $Y_u$. For FSL, $D_s$ includes one or a few images and their labels for each class from $D_u$, i.e., $D_s = \{X_s, Y_s\}$, with $Y_s \subseteq Y_u$.

Advantageously, the present invention provides a framework that can address both ZSL and FSL with minimal changes.

Figure 2:
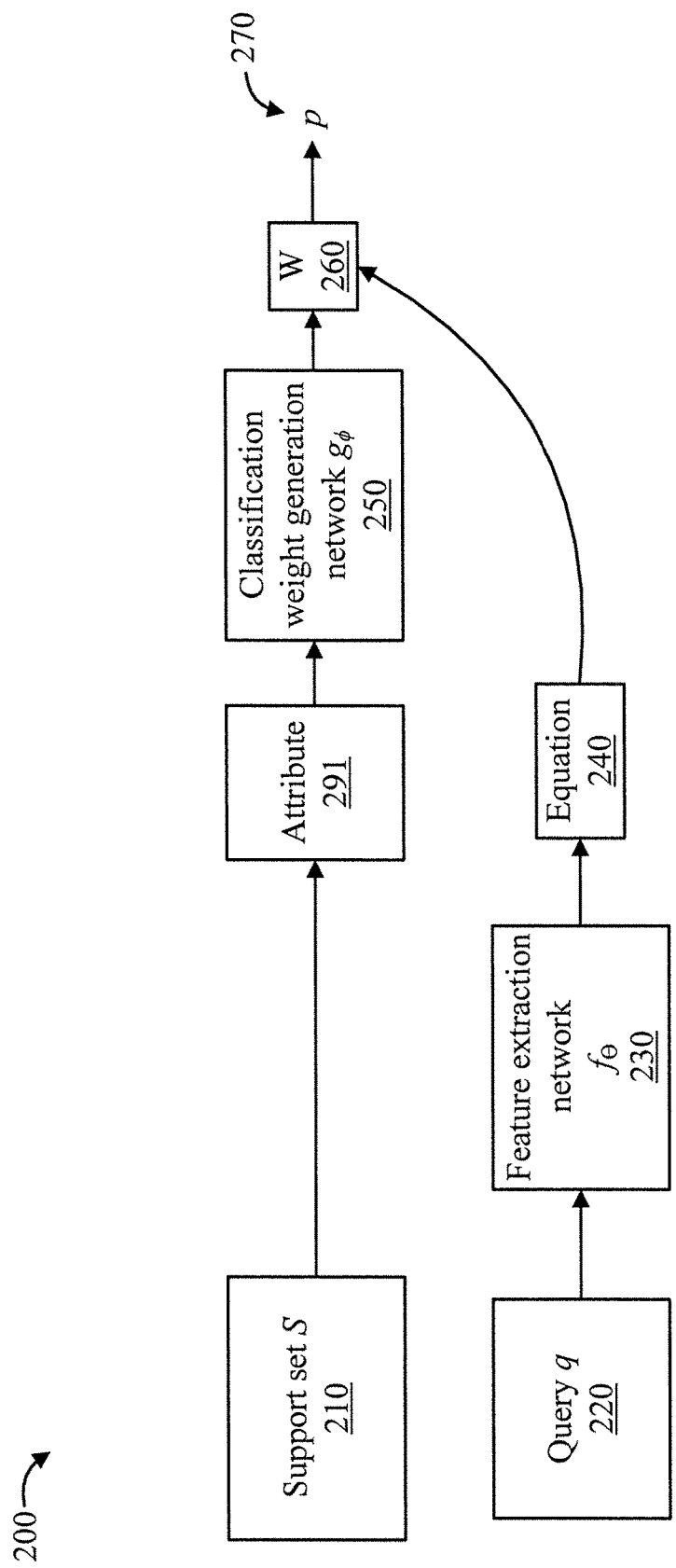
FIG. 2 is a diagram showing an exemplary Zero Shot Learning (ZSL) system, in accordance with an embodiment of the present invention.

FIG. 2 is a diagram showing an exemplary Zero Shot Learning (ZSL) system 200, in accordance with an embodiment of the present invention.

Figure 3:
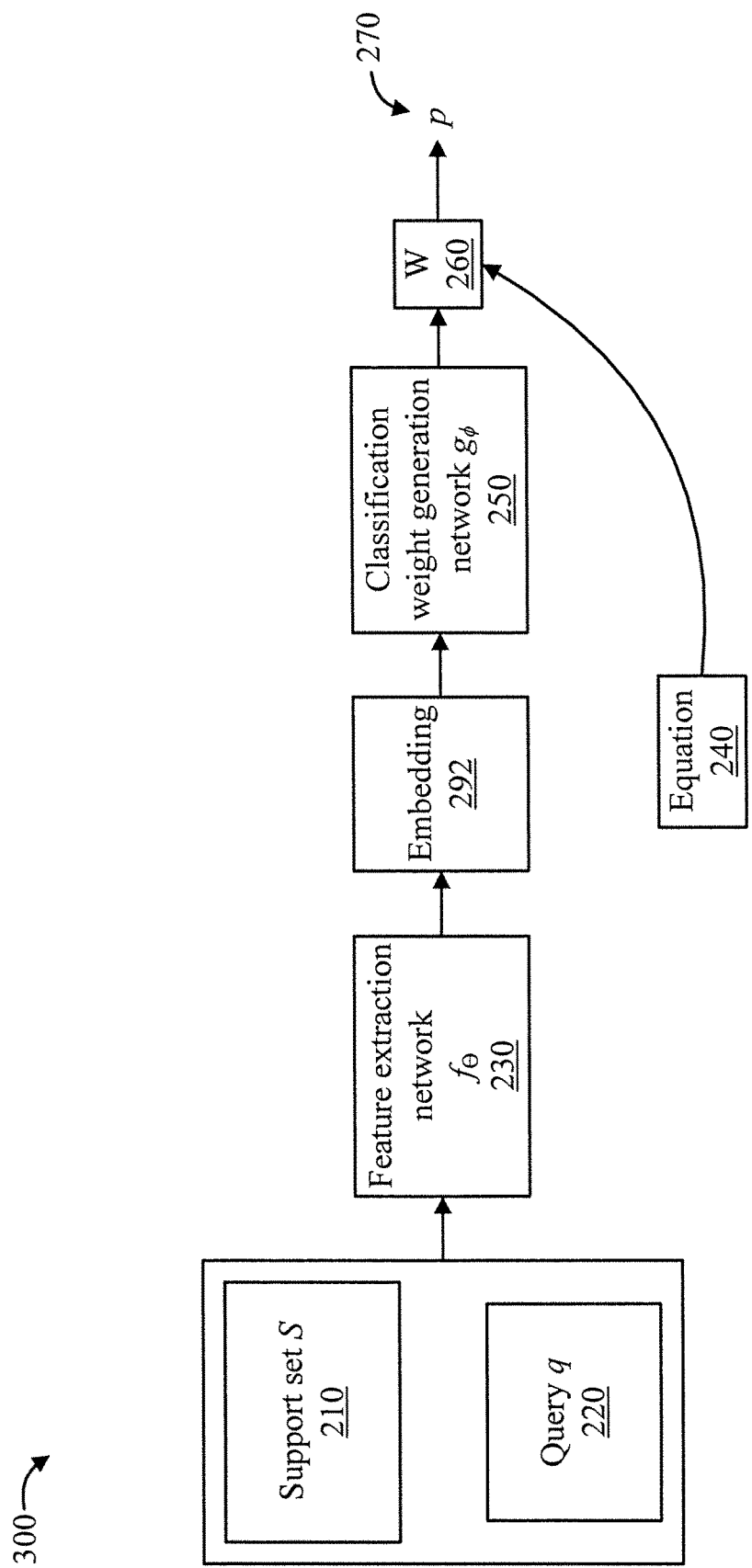
FIG. 3 is a diagram showing an exemplary Few Shot Learning (FSL) system, in accordance with an embodiment of the present invention.

FIG. 3 is a diagram showing an exemplary Few Shot Learning (FSL) system 300, in accordance with an embodiment of the present invention.

In FIGS. 2 and 3, systems 200 and 300 both include a support set S 210, a query Q 220, a feature extraction network 230, an equation 240, a classification weight generation network 250, a weight W 260, and a prediction p 270.

In FIG. 2, attributes 291 are shown relative to ZSL.

In FIG. 3, embeddings 292 are shown relative to FSL.

In FIGS. 2 and 3, $p = \text{softmax}(g_\phi(f_\theta(S))^T f_\theta(q))$.

Instead of jointly learning the feature extraction network weights and classification weights, which results in a heavy model that is hard to be adjusted for new classes with limited information, the learnable variables of a classification network are reparametrized as the combination of learnable variables of a feature extraction network and a weight generation network. In other words, the feature extraction network $f_\theta$ is decoupled from the classification weight W of a standard classification network. The feature extraction network $f_\theta$ is trained as a standard multi-class classification task to ensure a powerful feature extractor. Another network $g_\phi$ is learned to generate the classification weight W. Since $f_\theta$ is trained as a standard multiclass classification task to distinguish all classes within the training set, the resultant feature extractor is supposed to be able to generate more discriminative feature representation for images of new classes than that generated by a model trained in episode-based fashion where the model is trained to distinguish several classes within mini-batches. Meanwhile, $g_\phi$ is trained in episode-based fashion by constantly sampling new classes and minimizing the classification loss using the weights generated by $g_\phi$. After training, whenever some new classes come (e.g., in a query Q), along with supporting information in the form of either attribute vectors (ZLS) or few-labeled samples (FSL), $g_\phi$ generates generic classification weights that can effectively classify query images that belong to these new classes. Due to this network reparameterization strategy, a powerful yet flexible new class categorization model can be obtained.

Figure 4:
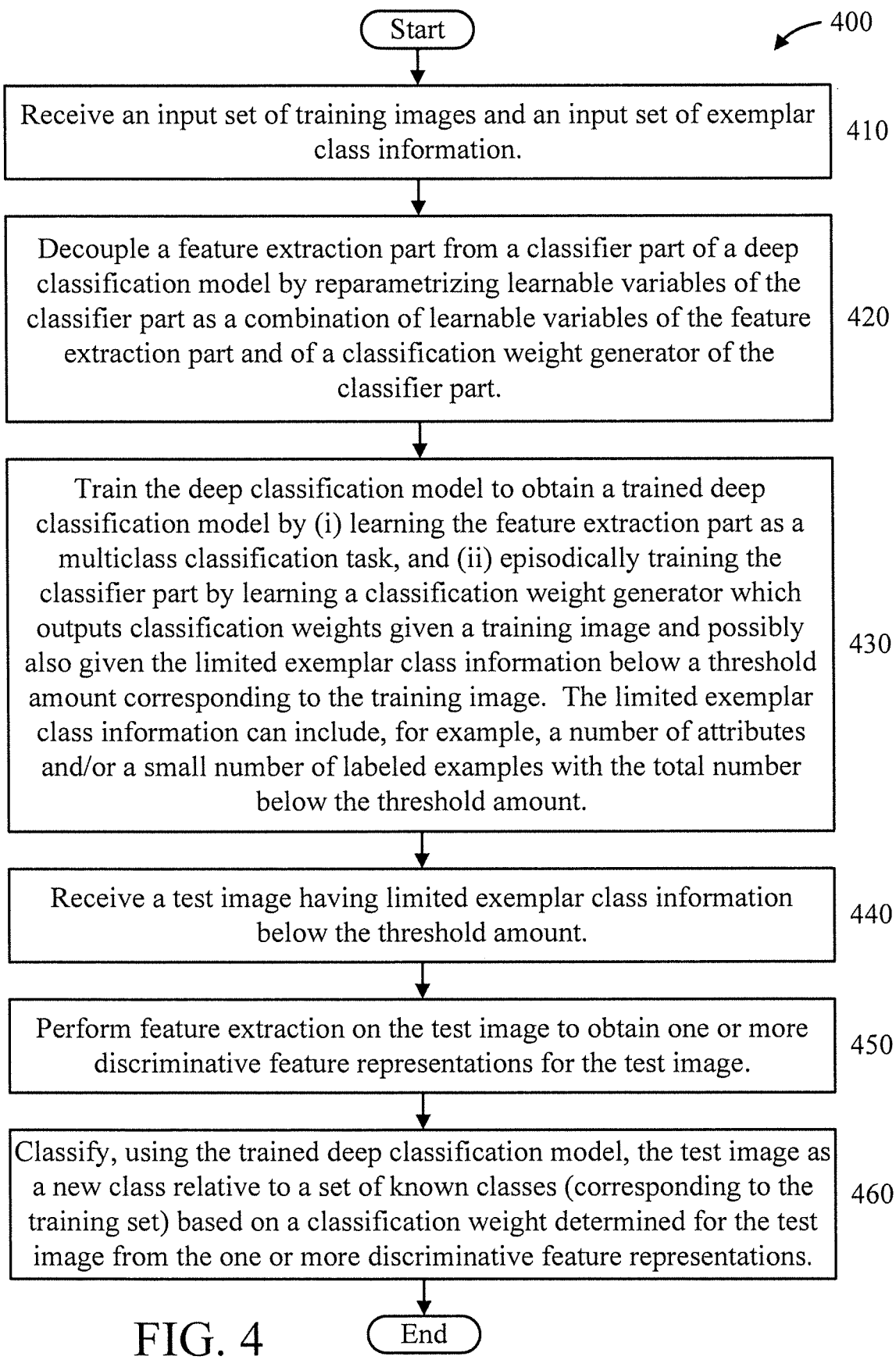
FIG. 4 is a flow diagram showing an exemplary method for New Class Categorization (NCC), in accordance with an embodiment of the present invention.

FIG. 4 is a flow diagram showing an exemplary method 400 for New Class Categorization (NCC), in accordance with an embodiment of the present invention.

At block 410, receive an input set of training images and an input set of exemplar class information.

At block 420, decouple a feature extraction part from a classifier part of a deep classification model by reparametrizing learnable variables of the classifier part as a combination of learnable variables of the feature extraction part and of a classification weight generator of the classifier part.

At block 430, train the deep classification model to obtain a trained deep classification model by (i) learning the feature extraction part as a multiclass classification task, and (ii) episodically training the classifier part by learning a classification weight generator which outputs classification weights given a training image and possibly also given the limited exemplar class information below a threshold amount corresponding to the training image. The limited exemplar class information can include, for example, a number of attributes and/or a small number of labeled examples with the total number below the threshold amount. In an embodiment, different thresholds can be used for the attributes versus the labels. In an embodiment, the same threshold can be used for the attributes and the labels. The determination of the thresholds can be performed by the user, and can be based on the amount of available attributes and/or labels, and/or other factors such as computation time, and so forth.

At block 440, receive a test image having limited exemplar class information below the threshold amount.

At block 450, perform feature extraction on the test image to obtain one or more discriminative feature representations for the test image.

At block 460, classify, using the trained deep classification model, the test image as a new class relative to a set of known classes (corresponding to the training set) based on a classification weight determined for the test image from the one or more discriminative feature representations.

Various descriptions follow regarding various features and aspects of the embodiments of the present invention.

A description will now be given regarding a cosine similarity based classifier, in accordance with one or more embodiments of the present invention.

The cosine similarity based softmax function is adopted to train the weight generator $g_\phi$. Cosine similarity is used for calculating a classification score in the last fully connected layer of deep neural network. This technique is adopted to train our weight generator $g_\phi$. The classification score of a sample (x, y) is calculated as $$p(y=n \mid x) = \frac{\exp(s\cos(w_n, f_\theta(x)))}{\sum_{j=1}^{N} \exp(s\cos(w_j, f_\theta(x)))}, \quad (1)$$

where s is a learnable scalar controlling the peakiness of the probability distribution generated by the softmax operator, and $w_j$ is the classification weight for class j. The classification score is generated by neural network $g_\phi$, taking supporting information of the class as input. Therefore, in a typical NCC task T, the loss function is calculated as $$L(\theta, \phi) = -\Sigma_{(x,y) \in T} \log p(y|x) + \lambda \|\phi\|_2 \quad (2)$$

where $\lambda$ is a hyper-parameter weighting the l2-norm regularization of the learnable variable of neural network $g_\phi$.

A further description will now be given regarding ZSL, in accordance with one or more embodiments of the present invention.

For zero-shot learning, class attributes $S=A_t \cup A_u$ are provided as the assistance for NCC. The basic assumption for existing ZSL algorithms is that the visual-attribute relationship learned from seen classes in a certain embedding space is class-invariant and can be applied on new classes. It is advantageous to select the visual space as the embedding space because the abundance of data diversity in the visual space can significantly mitigate the so-called "hubness" problem. The objective function is as follows:

$$L(\theta, \phi) = \frac{1}{M} \sum_{i=1}^{M} \|f_\theta(x_i) - h_\psi(a_{y_i})\|_2 + \lambda \|\psi\|_2 \quad (3)$$

where M is the total number of training examples, $f_\theta$ is a feature extraction model which output a representation vector $f_\theta(x_i)$ using image $x_i$ as input, and h is a mapping function which projects attribute vector $a_{y_i}$ of class $y_i$ to the embedding space where $f_\theta(x_i)$ lies. Through minimizing the least square embedding loss, the visual-attribute relationship can be established. With this relationship, in the testing stage, the attributes $A_u$ of new classes are mapped to the visual feature embedding space in which the visual feature of images of any new classes can find the best class attribute through nearest neighbor searching.

One can observe that this method learns the visual-attribute relationship by only utilizing the coincidence of the visual samples of a class with the associated semantic description. It however neglects to explore the inter-class separation of different classes, which shall be crucial to further avoid the hubness problem. To remedy this, we reformulate the learning of visual-attribute relationship from a regression problem to a visual feature classification problem. We directly learn a network $g_\phi$ that outputs the classification weights for classifying visual feature representations and use the Softmax loss in Equation (2) to guide the learning of the weight generation network. That is, the softmax function is used to guide learning of the weight generation network $g_\psi$ by minimizing the loss function in Equation (2) with $w_j = g_\psi(a_{y_j})$, j=1, ..., N for ZSL and $$w_j = \frac{1}{N} \sum_{j=1}^{N} f_\theta(x_j) \text{ for FSL.}$$

Through this reformulation, both intra-class compactness and inter-class separability are elegantly exploited for learning the visual-attribute relationship: Visual features of the same classes should be assigned with the same label (compactness), while visual features of different classes are assigned with different labels (separability).

The network reparameterization scheme is followed by decoupling the feature extraction module and the classification weight module which is generated by $g_\phi$. The feature extraction module is trained as a standard multi-class classification task to enable us to obtain discriminative feature representation for any given image. To learn $g_\phi$, the episode based training scheme is adopted by continuously exposing $g_\phi$ with new (randomly sampled) ZSL tasks so as to secure good performance when real new tasks come in the testing stage. More specifically, we keep randomly sampling from $D_t = \{X_t, Y_t\}$ and $A_t$ ZSL tasks and feeding them to the network. Each task includes $M_z$ classes and the associated $M_z$ attribute vectors. For each class, $N_z$ images are randomly sampled. With a batch of $M_z N_z$ images and $M_z$ attribute vectors, $g_\phi$ is trained via minimizing the loss function defined in Equation 2. In the testing stage, given attributes of new classes $A_u$, or $S=A_t \cup A_u$ for both all (seen and unseen) classes as in generalized ZSL setting, the corresponding classification weights are generated using $g_\phi$. The generated classification weights, integrated with the feature extraction network $f_\theta$, serves as the ZSL classification model for unseen classes.

A further description will now be given regarding FSL, in accordance with one or more embodiments of the present invention.

For few-shot learning (FSL), one/a few labeled samples $D_s = \{X_s; Y_s\}$ for each new classes are provided to help recognize objects of these classes. Our novel categorization framework can be easily extended from ZSL to FSL, simply by replacing the semantic attributes with feature embeddings as the input for the classification weight generation network $g_\phi$. More specifically, we adhere to the network reparameterization training scheme and learn feature extraction network $f_\theta$ and classification weight W separately to secure a powerful feature extractor and a flexible classifier. The feature extraction network $f_\theta$ is trained as a standard multi-class classification task, but the weight generation network $g_\phi$ is trained in the episode-based manner to enable $g_\phi$ to grasp enough knowledge of classifying new classes based on one/a few labeled samples. In details, during the training, we keep randomly sampling from $D_t = \{X_t, Y_t\}$ FSL tasks, each of which includes a support set and a query image set. Images in both sets are from the same classes. The support set includes $M_f$ classes and $N_f$ images for each class. With the feature embeddings of the $M_f N_f$ images as input, $g_\phi$ generates the classification weights of the $M_f$ classes, which are then used to classify the feature embeddings of images from the query set. The same applies as in ZSL, Equation 2 is used to guide the learning process. Note that if $N_f > 1$, i.e., each class has multiple support samples, the embeddings of all images belonging to the same class are averaged and fed to $g_\phi$.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for training a model for New Class Categorization (NCC) of a test image, comprising:
   decoupling, by a hardware processor, a feature extraction part from a classifier part of a deep classification model by reparametrizing learnable weight variables of the classifier part as a combination of learnable variables of the feature extraction part and of a classification weight generator of the classifier part; and
   training, by the hardware processor, the deep classification model to obtain a trained deep classification model by (i) learning the feature extraction part as a multiclass classification task, and (ii) episodically training the classifier part by learning a classification weight generator which outputs classification weights given a training image.

2. The computer-implemented method of claim 1, wherein the model for the NCC of the test image is trained given limited exemplar class information below a threshold amount.

3. The computer-implemented method of claim 2, wherein the limited exemplar class information comprises a number of semantic attributes below the threshold amount.

4. The computer-implemented method of claim 2, wherein the limited exemplar class information comprises a number of labeled examples below the threshold amount.

5. The computer-implemented method of claim 1, further comprising:
   performing feature extraction to obtain one or more discriminative feature representations for the test image; and
   classifying the test image as a new class relative to a set of known classes used to train the classification model based on a classification weight determined for the test image.

6. The computer-implemented method of claim 1, wherein said learning step comprises training the multiclass classification task to distinguish between all classes within a training data set.

7. The computer-implemented method of claim 1, wherein said training step comprising training the classification weight generator using a cosine similarity based softmax function.

8. The computer-implemented method of claim 1, wherein in said training step, the learning and episodically training steps are performed independently.

9. The computer-implemented method of claim 1, wherein the method is performed relative to a training set of images and a training set of exemplar class information corresponding to the training set of images.

10. The computer-implemented method of claim 1, wherein the classifier part guides a learning of the classification weight generator using a softmax function.

11. A computer program product for training a model for New Class Categorization (NCC) of a test image, the computer program product comprising a non-transitory computer readable storage medium having program instructions embodied therewith, the program instructions executable by a computer to cause the computer to perform a method comprising:
   decoupling, by a hardware processor of the computer, a feature extraction part from a classifier part of a deep classification model by reparametrizing learnable variables of the classifier part as a combination of learnable variables of the feature extraction part and of a classification weight generator of the classifier part; and
   training, by the hardware processor, the deep classification model to obtain a trained deep classification model by (i) learning the feature extraction part as a multiclass classification task, and (ii) episodically training the classifier part by learning a classification weight generator which outputs classification weights given a training image and the limited exemplar class information below the threshold amount corresponding to the training image.

12. The computer program product of claim 11, wherein the model for the NCC of the test image is trained given limited exemplar class information below a threshold amount.

13. The computer program product of claim 12, wherein the limited exemplar class information comprises a number of semantic attributes below the threshold amount.

14. The computer program product of claim 12, wherein the limited exemplar class information comprises a number of labeled examples with a total number below the threshold amount.

15. The computer program product of claim 11, wherein the method further comprises:
performing feature extraction to obtain one or more discriminative feature representations for the test image; and
classifying the test image as a new class relative to a set of known classes used to train the classification model based on a classification weight determined for the test image from at least the one or more discriminative feature representations.

16. The computer program product of claim 11, wherein said training step comprising training the classification weight generator using a cosine similarity based softmax function.

17. The computer program product of claim 11, wherein in said training step, the learning and episodically training steps are performed independently.

18. The computer program product of claim 11, wherein the method is performed relative to a training set of images and a training set of exemplar class information corresponding to the training set of images.

19. The computer program product of claim 11, wherein the classifier part guides a learning of the classification weight generator using a softmax function.

20. A computer processing system for training a model for New Class Categorization (NCC) of a test image, comprising:
a memory device including program code stored thereon;
a hardware processor, operatively coupled to the memory device, and configured to run the program code stored on the memory device to
decouple a feature extraction part from a classifier part of a deep classification model by reparametrizing learnable variables of the classifier part as a combination of learnable variables of the feature extraction part and of a classification weight generator of the classifier part; and
train the deep classification model to obtain a trained deep classification model by (i) learning the feature extraction part as a multiclass classification task, and (ii) episodically training the classifier part by learning a classification weight generator which outputs classification weights given a training image.

* * * * *